Nov. 20, 1934.    L. W. EGGLESTON ET AL    1,981,313
THERMOSTATICALLY OPERATED VALVE
Original Filed Oct. 15, 1930    3 Sheets-Sheet 1

Inventors
Lewis W. Eggleston and
Earnest J. Dillman
By their Attorney

Nov. 20, 1934.    L. W. EGGLESTON ET AL    1,981,313
THERMOSTATICALLY OPERATED VALVE
Original Filed Oct. 15, 1930    3 Sheets-Sheet 2
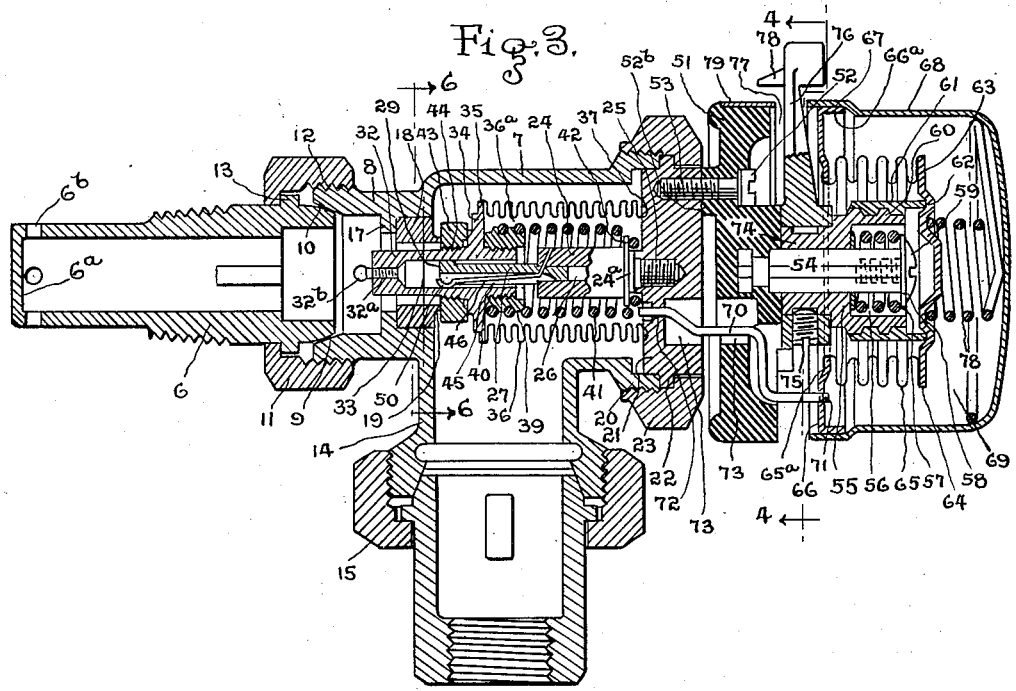
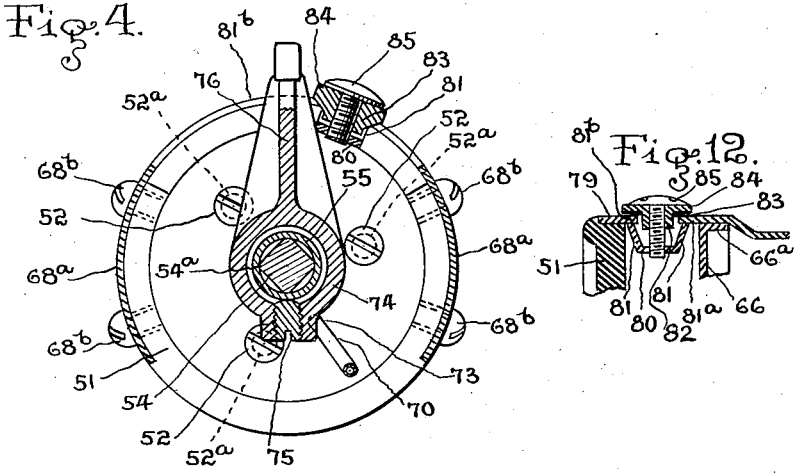
Inventors
Lewis W. Eggleston and
Earnest J. Dillman
By their Attorney

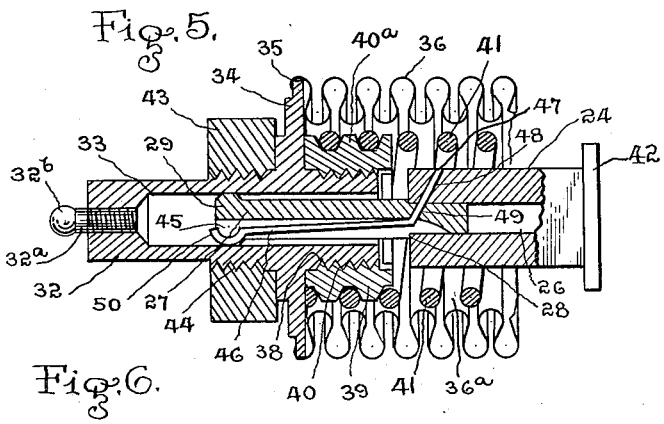

Patented Nov. 20, 1934

1,981,313

UNITED STATES PATENT OFFICE 1,981,313

THERMOSTATICALLY OPERATED VALVE

Lewis W. Eggleston and Earnest J. Dillman, Detroit, Mich., assignors to Detroit Lubricator Company, Detroit, Mich., a corporation of Michigan Application October 15, 1930, Serial No. 488,706
Renewed January 13, 1934

14 Claims. (Cl. 236—42)

Our invention relates broadly and generally to new and useful improvements in thermostatically operated valves for controlling or regulating the supply of heating medium, such, for example, as steam, to heat exchange apparatus in order to obtain a desired heat output from such apparatus.

One object of our invention is to provide a thermostatically operated valve structure which will be capable particularly of use in connection with that form of heat exchange apparatus known as househeating radiators, and which will operate efficiently in response to and under control of the temperature of the space to which such radiator emits or delivers heat to regulate the flow of the heating medium to the radiator and thereby control its heat output to maintain a desired temperature in the space to be heated.

While we have shown and hereinafter described a preferred embodiment of our invention for use in connection with a househeating radiator of well-known construction, we desire it understood that it is not limited to such use, as the invention is capable of use for thermostatic control of flow of fluid heating medium for purposes other than that herein described.

The invention consists in the improved construction and combination of parts, to be more fully described hereinafter, and the novelty of which will be particularly pointed out and distinctly claimed.

In the accompanying drawings forming a part of this specification, we have illustrated a preferred embodiment of our invention, and in which drawings—

Fig. 3 is a longitudinal, vertical, central section through Fig. 2;

Fig. 4 is a transverse section on the line 4—4 of Fig. 3;

Fig. 5 is an enlarged, detail, sectional view on the same line as Fig. 3 showing a valve head or disk and certain of the elements associated therewith;

Fig. 6 is a section on the line 6—6 of Fig. 3;

Fig. 7 is a face view of a closure or bonnet member for the valve body, as it appears when looking from the right toward the left of Fig. 3;

Fig. 8 is a detail, sectional view of a support and heat-insulating member;

Fig. 9 is a detail, sectional view of a valve guide-member and support, with the parts in the position assumed before assembly in the position shown in Figs. 3 and 5;

Fig. 10 is an enlarged, detail view in side elevation of one end of a valve guide-member and showing a bearing head upon which the valve head is slidably guided and can pivot or rock;

Fig. 11 is a face view of said bearing head, looking from the left of Fig. 10, and Fig. 12 is a detail, sectional view of an adjustable stop, also shown in Figs. 2 and 4.

Figure 1:
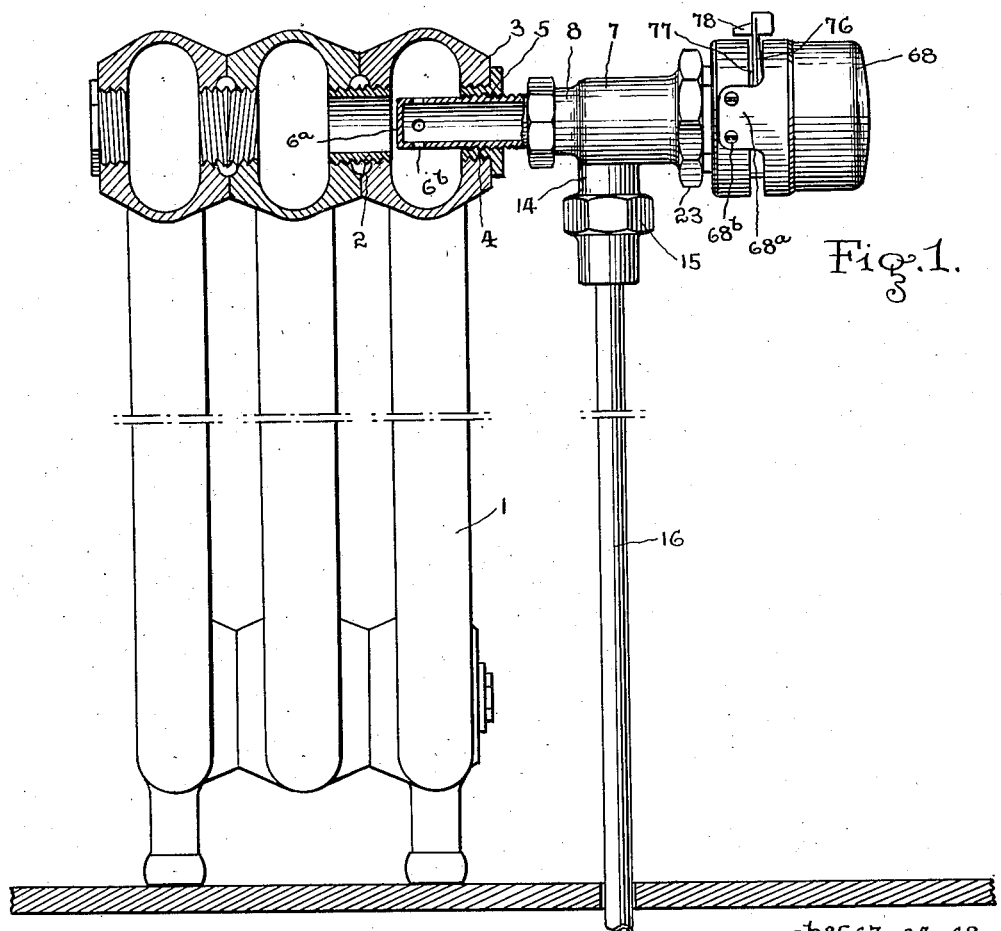
Figure 1 is a view in side elevation, partly in section, showing a structure embodying our invention applied to one form of radiator employed for heating purposes.

Referring to the drawings by characters of reference, 1 designates, generally, one form of heating radiator in connection with which our improved thermostatic valve is adapted to be used, it being understood that such form of radiator is shown merely by way of example. The radiator shown comprises a plurality of hollow sections or loops communicatively connected in parallel relation by oppositely threaded flow nipples 2 at the top and bottom thereof, in a well-known manner. Our improved valve is adapted to be connected communicatively to the upper, outer hub 3 of the radiator, and for this purpose said hub may be provided with a bushing 4 screwed into said hub, and which is internally threaded, as at 5, to threadedly receive an inlet member in the form of a tube or pipe section 6 to which the valve body, to be described presently, is attached.

7 designates a hollow valve body, the same being shown as substantially cylindrical in external and internal formation, and having at one end an integral outlet nipple 8 having an inclined, annular recess 9 to receive a tapered head 10 on the outer end of the member 6, the valve body and said member 6 being rigidly united by means of a securing nut 11 adapted to threadedly engage the member 8, as at 12, and react against a flange 13 on the member 6 to clamp the latter and said nipple together. The body is provided with a tubular branch member 14 constituting an inlet by which the radiator heating fluid is admitted to the body, said member 14 being adapted to be secured communicatively by a suitable pipe coupling 15 to a pipe 16 for supplying such fluid, for example steam. In the nipple member 8 which constitutes the outlet connection from the valve body to the radiator, is an annular flange 17 against which is seated and held an annular, ported valve seat member 18 having an annular contact rib or seat 19 surrounding the opening therethrough. The end of the valve body opposite to the connection 8 is provided with an externally threaded, annular flange 20, and this end of the body is closed by a removable closure head or bonnet member 21 sleeved within the flange 20 and having an annular flange 22 to overlie and abut the end of the flange 20, the head 21 being secured in place by a clamping nut 23 overlying the flange 22 and threaded onto the flange 20 whereby a fluid-tight joint is made between the head 21 and the valve body.

Rigidly supported on the inner face of the head and in axial alinement with the outlet passage through the seat member 18, is a supporting member, preferably in the form of a post or stem 24 having a threaded extension 25 screwed into the head 21 whereby the post is rigidly secured thereto, said post being provided with a circular, longitudinal bore 26. Seated in the bore 26 is a valve guide-member, preferably in the form of a rigid bar 27 having a shoulder 28 abutting the end of said stem 24, the outer end of said bar being provided with an external surrounding flange or guide head 29, said head being substantially rectangular in end view, as shown in Figs. 6 and 11. The corners of the rectangular head are rounded, as at 30, to provide arcuate guide or bearing surfaces which lie in the same circle coaxial with the bar 27, the edges of the head in front and rear of said guide faces 30 being rounded in a direction longitudinally of said bar, as at 31, to provide for rocking or pivotal movement of the valve member, as will be presently described. It will be understood that the member 27 is rigidly seated in the bore 26 so as to be held against lateral and longitudinal movement, as, for example, by a drive fit.

Slidably mounted on the post 27 is a valve carrier, consisting preferably of a tubular member 32 having a cylindrical bore 33 extending transversely to the plane of the valve seat and fitting over the post 27 and longitudinally slidable thereon toward and away from the valve seat 18, the sliding contact being between the cylindrical face of the bore 33 and the arcuate guide faces 30 on the head 29. It will be seen that the post 24, bar 27, and valve carrier 32 are coaxial longitudinally of each other, and that their axes are central of the head 21 and the outlet port through the valve seat 18. The valve carrier 32 is provided intermediate its ends with an annular, radially projecting flange 34 to the periphery of which is connected and sealed, as at 35, one end of an expansible-collapsible member, preferably in the form of a flexible and resilient, one-piece, tubular, metallic bellows 36, the other end of which is anchored and sealed by solder, as at 37, in a groove in the inner face of the head 21. The bellows 36 is longitudinally coaxial with the valve carrier and the supporting and guiding means therefor, and provides an expansible-collapsible sealed chamber 36ª between the head 21 and flange 34, which chamber encloses the rear portion of the valve-carrier and the elements 24 and 27. The chamber 36ª is exposed directly to and is consequently heated by the fluid heating medium entering the valve body and constitutes a hot chamber for the reception and evaporation of volatile material therein, as will be presently described. At its rear end which projects into the chamber 36ª, the valve-carrier is externally threaded, as at 38, to receive a spring anchor, preferably in the form of a collar 39 threaded onto the carrier, as at 40, and having an external thread 40ª. Connected to the collar 39 by interlocking engagement with the thread 40ª is one end of a retractile spring 41, the other end of which is suitably anchored, as at 42, between the head 21 and a flange 24ª on the post 24, the function of said spring being to tend normally to withdraw the member 32 rearwardly along the post 27 and away from the valve seat 18 to open the port therethrough.

At the outer end of member 32, that is, outside of the chamber 36ª, is a valve disk 43 threaded onto said member, as at 44, and abutting the outer face of said flange 34 so as to move with said member, this disk cooperating with the seat rib 19 to open and close the outlet from the valve body to a radiator, as shown in Fig. 3. The valve disk 43 is shown in closed position in Fig. 3, and it is the function of the spring 41 to retract said disk from closed position on the seat when permitted by the thermostatic means, as will be hereinafter described. As heretofore stated, the valve-carrier 32 is capable of a rocking or pivot movement, as well as a sliding movement on the head 29 on the guide bar 27, the pivotal or rocking movement being provided in order to assure proper seating contact of the valve disk 43 on its seat.

Means is provided for resisting or restraining the movement of the carrier on its guide, particularly when being moved to open position, to thereby prevent any vibration of the valve on its seat, which might cause "chattering" when the valve is slightly open and steam flows between the valve disk and the seat. For the purpose mentioned, the guide post 27 is provided with a longitudinal slot 45, in which is arranged a friction-holding member, preferably in the form of a leaf spring 46, having one end bent, as at 47, and seated in alining apertures 48, 49 in the stem 24 and the guide post 27, respectively, said spring having at its free end a turned-up head 50 having a curved contact face 50ª (Fig. 9), which yieldingly and slidably contacts the face of the bore 33 adjacent the pivotal or rocking point of the carrier member 32 on the head 29. The spring normally tends to take the position shown in Fig. 9, and thereby yieldingly engages the member 32 to set up a certain amount of resistance to movement of member 32, and also to take up any play which may exist between the inner face of the bore 33 and the head 29. It will be seen that the method of anchoring the rear end of the spring serves to secure the post 27 in the stem 24, and prevent turning of the post on its longitudinal axis.

Mounted on and carried by the external face of the head 21, and located in a plane parallel thereto, is a baffle or disk 51 of suitable heat insulating material, preferably bakelite, this baffle being secured to the head 21 by screws 52 projected through openings 52ª in said baffle and threaded into the head, as at 53, the screws being surrounded by bosses 52ᵇ integral with the baffle in order to space the same from the head 21 and provide an intervening air gap to provide for air flow to reduce heat transfer from the head to the baffle.

We will now describe the thermostatic means for controlling the operation of the valve: Secured to the center of the baffle 51, preferably by anchoring the same therein when molded, as indicated at 51ª, is an outwardly projecting stud 54 which is square in cross-section with rounded or flattened corners 54ª (see Figs. 4 and 8), and upon which is mounted rotatably a sleeve 55 having an end recess 56 surrounding the free end of the stud, and in which recess is located a friction spring 57 acting expansively between a washer 58 and the base of said recess, the washer being fixed to the stud by a screw 59 threaded into the end of the stud. The spring affords a certain degree of frictional resistance to rotation of the sleeve 55 so that the same will be held to any position it may be adjusted rotatably on the stud 54, unless intentionally rotated. Threaded on the sleeve 55, as at 60, and coaxial therewith, is a collar 61, the outer end of which is rigidly united, as at 62, preferably by soldering, to a rigid head 63, in the form of a circular plate, to which is sealed, as at 64, one end of a flexible and resilient, expansible-collapsible element, preferably in the form of a metallic bellows 65, the other end of which is secured and sealed, as at 65a to the edge of a central opening through an annular plate or ring 66 surrounding the sleeve 55. The plate 66 is provided with an annular flange 66a sleeved and sealed, as at 67, in the open end of a cup-shaped metallic container or shell 68 which surrounds and is spaced from the bellows 65 and forms therewith and with the head 63 a closed, thermostatic cell or chamber 69 to receive a suitable volatile liquid, such, for example, as acetone, which volatilizes at a temperature of approximately 135° F. It will be understood that the thermosensitive material is not limited to that just mentioned, but may be selected to suit conditions. The interior of the chamber 69 communicates with the interior of the hot chamber 36a in the valve body through a metallic tube 70 of small bore—say, approximately $\frac{1}{32}$ inch in diameter. One open end of this tube is sealed in an opening 71 in the plate 66, and the other open end is sealed in an opening 72 in the head 21 at a point within the circumference of chamber 36a, the intermediate portion of the tube passing through an opening 73 in the heat baffle 51. It will be understood that the thermostatic cell 69 and the hot chamber 36a are sealed fluid-tight, except for the communication therebetween through the tube 70, and that the tube 70 provides for passage of the thermostatic fluid, or vapor thereof, back and forth between said cell and the chamber under predetermined temperature changes, as will be presently described. The sleeves 55, 61 and plate 66 constitute means for adjusting the volumetric capacity of the thermostatic cell chamber 69 in order to set the temperature point at which the thermostatic means will respond to temperature changes in order to open and close the valve. The sleeve 61 is adjusted by means of rotation of the sleeve 55, and for this purpose the sleeve 55 has attached thereto a surrounding collar 74 locked to said sleeve by means of a clamping screw 75 entering a groove in said sleeve, as shown in Figs. 3 and 4 of the drawings, said collar being rotatable by means of a manually operable lever 76 projecting radially from said collar and movable in an arc through an air space 77 and provided preferably with an indicating pointer 78 to cooperate with suitable calibrations or other indications on a strip 79 secured to the periphery of the baffle 55 in order to permit proper setting of the valve to cause operation at a desired temperature. It will be seen that by swinging the lever through the space 77 the sleeve 55 will be rotated, and due to the threaded connection 60 will project or retract sleeve 61 and head plate 63 to increase or decrease the fluid containing space 69 within the cell. The shell 68 of the thermostatic cell is provided with ears 68a overlying and secured to the periphery of the baffle 51 by means of screws 68b, whereby the thermostatic cell is secured rigidly in the assembly and is prevented from turning when the lever 76 is operated.

The air space 77 also provides for air flow between the baffle 51 and the thermostat, and into the bellows 65, so that the thermostatic cell is subjected both externally and internally to the temperature of the surrounding air, this providing for prompt response of the thermostat. An expansion coil spring 78 is located between the head of the shell 68 and the adjustable plate 63, and exerts its force continuously to take up any play which might exist through wear, or otherwise, between the threads on the sleeve 55 and collar 61. By the spring 78 maintaining a close engagement between said threads, an accurate and close adjustment of the point of response by the thermostatic cell is assured.

Figure 2:
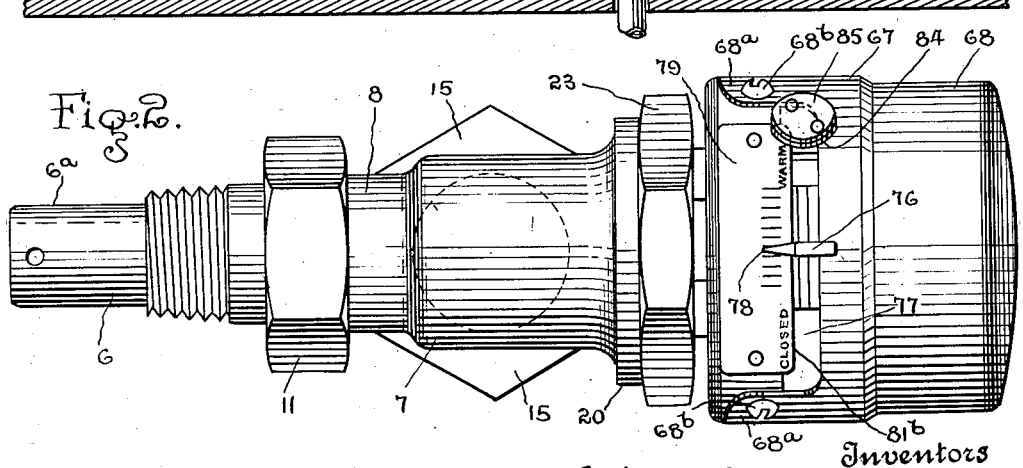
Fig. 2 is a top plan view of an embodiment of our invention.

A suitable stop may be provided for limiting movement of lever 76 in either direction, but preferably to limit such movement in the direction increasing the temperature point at which the valve will function. As shown in Figs. 2, 4 and 12, this stop preferably comprises a clamping washer 80 located in said space between the members 51 and 66 and having projections 81 located beneath circumferential flanges 81a, 81b provided by the opposite edge portions of the plate 79 and the shell 68 of the thermostat. Disposed in the slot formed by the flanges 81a, 81b is the shank 82 of a clamping block 83 having a head 84 located on the outer faces of said flanges and overlying the latter. The washer 80 and the block 83 are adapted to be drawn together by a headed clamping screw 85 passing through block 83 and threaded into washer 80 to thereby clamp the flanges 81a, 81b between said block and the projections 81 to set said stop in fixed position in the path of the lever 76 and limit its movement. By loosening the screw 85 the stop may be moved circumferentially of the baffle, and then by tightening the screw be set in any desired position to limit the adjustment of the lever and consequently the point of operation of the valve. The system, including the thermostatic cell 69, the tube 70 and the hot chamber 36a, is charged under vacuum with sufficient volatile liquid to completely fill the cell 69 when all of the liquid in the system is in said cell, and for this purpose the guide 32 is provided with a filling tube 32a through which the liquid can be charged into the system and then be sealed by solder, or otherwise, as at 32b.

The operation of the embodiment above described is as follows: The tension spring 41 normally holds the valve open, or partially open, and when the temperature of the air in the room rises above the point of operation for which the thermostatic cell is adjusted by the lever 76, the air in contact with the cell heats the liquid therein and causes said liquid to expand, resulting in a small portion of the liquid being forced through the capillary tube 70 into the chamber 36a, the walls of the cell being held rigid against expansion. When steam is on the system, the chamber 36a is heated thereby to a temperature above that of vaporization of the thermostatic liquid, so that when the liquid enters said chamber it is vaporized quickly and generates sufficient fluid pressure in said chamber to overcome the resistance of the spring 41 and expand the element 36 longitudinally to move the valve to closed position, thus cutting off the supply of heating means to the radiator. When the temperature of the air surrounding the thermostatic cell falls below the determined point, the liquid in the cell 69, becoming cooler, contracts and draws the vapor out of the hot chamber 36ª through the capillary tube 70 into the cell, thus relieving the fluid pressure in the hot chamber 36ª and permitting the tension spring 41 to move the valve from its seat, the vapor condensing in the cell.

When the valve is first applied to a radiator, as shown in Fig. 1, and when both the valve and the radiator are cold, that is, there is no steam in the radiator, and the temperature of the room is lower than that at which the thermostat is set by the lever 76 to open and close the valve, the following operation takes place when steam is first supplied to the valve body through the pipe 16: The thermo-responsive liquid may be either in the chamber 36ª or in the thermostatic bulb 69, or possibly in both, and the spring 41 will be exerting its retractile force to hold the valve head 43 in open position away from its seat 19. The steam when admitted to the body will heat the bellows 36 and associated parts to a point above the boiling point of the volatile liquid, thereby vaporizing some of the liquid in said bellows and driving any unvaporized liquid through the tube 70 over into the thermostatic cell 69, wherein any vapor passing with the liquid will be condensed, due to the fact that the cell 68 will be at a lower temperature than that of the chamber 36ª. If at this time sufficient pressure has been generated by the vaporization of the liquid in the bellows 36 to overcome the spring 41, the pressure will react against the flange 34 and the parts carried thereby, to close the valve and hold it closed against the seat 19, and the flow of steam to the radiator will be terminated. Under the condition just mentioned, there will be vapor in the bellows 36 and possibly in the tube 70, and this condition will persist until all of the liquid and vapor is driven over into the colder thermostatic bulb and condensed therein, whereupon the spring 41 will open the valve and admit steam to the radiator.

When the temperature of the room in which the cell 68 is located rises sufficiently to heat the cell and cause the condensed liquid therein to expand, some of the liquid will be driven as such through the tube 69 to a point in the tube where the temperature of the tube, due to its connection with the hot chamber 36ª, will vaporize the liquid, the vapor passing into the chamber 36ª and creating sufficient pressure in said chamber to overcome the tension of the spring 41 and result in the seating of the valve. In other words, the liquid as such may but does not necessarily reach the chamber in the bellows 36, because the tube may be heated for a given distance back from the valve to a temperature hot enough to vaporize the liquid in the tube. When the pressure in the chamber 36ª increases sufficiently to close the valve, and if after closing of the valve, the room temperature does not increase further, the liquid lying in the tube will remain in a balanced point therein. However, if the room temperature should increase, then the liquid in the thermostatic cell will be expanded to a point where some of the liquid will be forced into the chamber 36ª, and at this time the pressure of the liquid will correspond with the temperature of the steam surrounding the bellows. On the other hand, if the room temperature does not increase when the valve closes, the pressure of the gas in the bellows will only be sufficient to maintain the closed position of the valve until the temperature of the air surrounding the thermostatic cell drops to a point where contraction of the liquid in the cell causes the liquid to be drawn back from the bellows through the tube and into the cell.

When the room temperature surrounding the thermostatic cell drops below the adjusted point, the liquid in the thermostatic cell will contract, thereby creating a vacuum condition in the cell which will act to suck the volatile, or vapor of the volatile, back from the chamber 36ª through the tube 70 into the cell, resulting in a reduction of the pressure in chamber 36ª and enabling the valve spring 41 to open the valve to supply steam to the radiator. It will be understood that the chambered system, including the cell 69, the tube 70, the bellows 36, and the hollow element 32, is placed under vacuum when being charged with the thermostatic material.

It will be understood that the lever 76 when adjusted will increase or decrease the volumetric capacity of the chamber 69 by retracting or projecting the head 63, and that by this adjustment will be determined the range of temperature change within which the transfer of the volatile between the cell and the bellows chamber 36ª will take place in effecting the opening and closing of the valve. For example, the range of adjustment may be from 35° F. to 80° F., so that the valve will be caused to function at any desired temperature within said range according to the point at which the lever is set.

The thermostatic cell is insulated by the baffle 51 from heat which might otherwise be conducted thereto through the metal parts of the valve upon which the cell is supported, but the cell is subject to the temperature of the rising air currents flowing over the hot steam pipe 16 and the adjacent parts of the radiator, so that the proper amount of liquid is used to assure that the expansion and contraction thereof will take place when the heat effect on the cell, due to the combined air currents from the radiator and steam pipe and the air surrounding the cell, rises above or falls below a given point determined by adjustment of the lever 76. In order that the effective convection currents rising from the radiator will promptly reach the high point, the coupling member 6 is provided with a closed end 6ª with one or more ports 6ᵇ which cause the steam, when the valve is opened, to be directed downward into the first or adjacent loop of the radiator, so that said loop is promptly heated and the rising currents flowing thereover will be heated immediately and promptly exert their heat effect on the cell when the steam is turned on to the radiator. This results in prompt action of the thermostat in closing the valve when the surrounding air of the room being heated reaches a desired point according to a thermometer—for example, 70° F.

If it be desired to close the valve, the adjusting lever 76 may be moved manually to be set at the end of the dial strip 79 at the point corresponding to 35° F., i. e., at the point bearing the legend "Closed", which will result in a considerable amount of the volatile liquid being expelled from the cell 69 into the hot chamber 36ª, thus causing generation of sufficient pressure to close the valve and keep it closed tightly against its seat. Under the adjustment just described, the valve will stay closed so long as the temperature around the cell is above 35° F. It will be understood that the point of adjustment of the lever which would cause the thermostat to hold the valve shut, would be set low enough to assure that the temperature of the space effecting the cell 68 would not be likely to drop lower than such setting, and thereby cause the valve to open.

What we claim and desire to secure by Letters Patent of the United States is:

1. A thermostatically operated valve comprising a hollow body having inlet and outlet openings and a ported valve seat, a valve in said body and cooperable with said seat, a sealed expansible-collapsible chamber in said body and heated by heating fluid in said body, and connected operatively to said valve to move it toward said seat, a thermostatic cell external to said body and supported thereby and connected communicatively to said chamber by a flow passage, said cell containing a thermo-responsive volatile liquid which expands and contracts in said cell in response to temperature change at said cell and acting when expanded to enter said chamber and be vaporized therein to create pressure to expand said chamber to move said valve toward closed position relative to said seat, and upon contraction to cause the fluid to flow from said chamber to said cell and permit said chamber to collapse, a retractile spring in said chamber to collapse said chamber and move said valve away from said seat, a fixed guide-post in said chamber to guide said valve in its movements relative to said seat, and means whereby said valve has a sliding and rocking movement on said post.

2. A thermostatically operated valve comprising a hollow body having inlet and outlet openings and a ported valve seat, a sealed expansible-collapsible chamber in said body and heated by heating fluid in said body and having a rigid head movable therewith, a valve carried by said head and cooperable with said seat, a fixed guide-post in said chamber and extending longitudinally thereof for guiding said head, means whereby the head has rocking and sliding movements on said guide, a thermostatic cell external to said body and connected communicatively to said chamber by a flow passage, said cell containing a thermo-responsive volatile liquid which expands and contracts in said cell and acting when expanded to enter said chamber and be vaporized therein to create pressure to expand said chamber to cause said head to move the valve toward closed position relative to said seat, and upon contraction to cause the fluid to flow from said chamber to said cell and permit said chamber to collapse, and a retractile spring in said chamber and surrounding said post and acting on said head to move said valve away from said seat, said spring having one end fixed within the chamber and the other end connected to said head.

3. A thermostatically operated valve comprising a hollow body having inlet and outlet openings and a ported valve seat, a sealed expansible-collapsible chamber in said body and heated by heating fluid in said body and having a rigid head movable therewith, a valve carried by said head and cooperable with said seat, a fixed guide post in said chamber for guiding said head, means whereby the head has rocking and sliding movements on said post, a thermostatic cell external to said body and connected communicatively to said chamber by a flow passage, said cell containing a thermo-responsive volatile liquid which expands and contracts in said cell and acting when expanded to enter said chamber and be vaporized therein to create pressure to expand said chamber to cause said head to move the valve toward closed position relative to said seat, and upon contraction to cause the fluid to flow from said chamber to said cell and permit said chamber to collapse, a retractile spring in said chamber and acting on said head to move said valve away from said seat, and resilient friction means between said head and guide-post to resist the movements of said head on said guide-post.

4. A thermostatically operated valve comprising a hollow body having inlet and outlet openings, an expansion chamber in said body and heated by the fluid entering said body, a valve operated by said chamber, guide means for said valve located in said expansion chamber, means whereby said valve has sliding and rocking movements on said guide means, said guide means having a slot, a leaf spring in said slot and frictionally engaging the valve to resist sliding movement thereof, a thermostatic cell external to said body and communicating through a flow passage with said chamber and containing a volatile liquid which expands and contracts under temperature change and adapted when expanded to enter said chamber and be vaporized therein to expand said chamber to move said valve toward closed position relative to said seat, and upon contraction to cause the fluid to pass from said chamber into said cell to permit said chamber to collapse, and a spring acting when the fluid passes from said chamber to collapse said chamber to thereby move the valve away from said seat.

5. A thermostatically operated valve comprising a hollow body having inlet and outlet openings and a ported valve seat, a reciprocable valve cooperable with said seat, an expansible-collapsible hot chamber in the body and operatively connected to said valve, a member external to said body and supported thereby, a thermostatic cell carried by said member and communicatively connected to said chamber, said cell having a movable wall and containing a volatile liquid, a post on said member, and a sleeve reciprocable on said post and operatively connected to said wall to adjust the same to vary the internal volumetric capacity of said cell.

6. A thermostatically operated valve comprising a hollow body having inlet and outlet openings and a ported valve seat, a reciprocable valve cooperable with said seat, an expansible-collapsible hot chamber in the body and operatively connected to said valve, a member external to said body and supported thereby, a thermostatic cell carried by said member and communicatively connected to said chamber, said cell having a movable wall and containing a volatile liquid, a post on said member, a member rotatable on the post, and a sleeve threaded on said rotatable member and movable lengthwise thereof and operatively connected to said wall to adjust the same to vary the volumetric capacity of the cell.

7. A thermostatically operated valve comprising a hollow body having inlet and outlet openings and a ported valve seat, a reciprocable valve cooperable with said seat, an expansible-collapsible hot chamber in said body and connected operatively to the valve, a thermostatic cell comprising an outer rigid shell secured to the body, and an internal bellows housed in the shell and sealed thereto, said cell containing a volatile liquid and being communicatively connected to said hot chamber, a post carried by the body and projecting toward said bellows, and a member on the post and having operative connection with the bellows to expand or contract the bellows to 8. A thermostatically operated valve comprising a hollow body having inlet and outlet openings and a ported valve seat, a reciprocable valve cooperable with said seat, an expansible-collapsible hot chamber in said body and connected operatively to the valve, a thermostatic cell comprising an outer rigid shell secured to the body, and an internal bellows housed in the shell and sealed thereto, said cell containing a volatile liquid and being communicatively connected to said hot chamber, a post carried by the body and projecting toward said bellows, a member on the post and having operative connection with the bellows to expand or contract the bellows to thereby regulate the volumetric capacity of said cell, and means for reciprocating said member.

9. A thermostatically operated valve comprising a hollow body having inlet and outlet openings and a ported valve seat, a reciprocable valve cooperable with said seat, an expansible-collapsible hot chamber in said body and connected operatively to the valve, a thermostatic cell comprising an outer rigid shell secured to the body, and an internal bellows housed in the shell and sealed thereto, said cell containing a volatile liquid and being communicatively connected to said hot chamber, a post carried by the body and projecting toward said bellows, a member on the post and having operative connection with the bellows to expand or contract the bellows to thereby regulate the volumetric capacity of said cell, and means for reciprocating said member, said means comprising a rotatable member on said post and having a thread connection with said first-named member.

10. A valve of the character described, comprising a hollow body having inlet and outlet openings and a ported valve seat, a head closing said body opposite to said seat, a guide post supported by said head, a valve carrier reciprocable on said post and carrying a valve cooperable with said seat, and an expansible-collapsible tubular member surrounding said post and sealed at its ends to said head and to said carrier, said tubular member defining a pressure chamber operable upon the occurrence of internal fluid pressure to move said valve toward said seat.

11. A valve of the character described, comprising a hollow body having inlet and outlet openings and a ported valve seat, a head closing said body opposite to said seat, a guide post supported by said head, a valve carrier reciprocable on said post and carrying a valve cooperable with said seat, an expansible-collapsible tubular member surrounding said post and sealed at its ends to said head and to said carrier, and means to supply a pressure medium to the interior of said tubular member to move said valve toward said seat.

12. A thermostatically operated valve comprising a hollow body having inlet and outlet openings and a ported valve seat, a reciprocable valve cooperable with said seat, an expansible-collapsible hot chamber in said body and connected operatively to the valve, a thermostatic cell comprising an outer rigid shell secured to the body, an internal bellows housed in the shell and sealed thereto, said cell containing a volatile liquid and being communicatively connected to said hot chamber, a supporting member fixed relative to said shell and projecting into said shell and said bellows, a longitudinally reciprocable member carried by said supporting member and having operative connection with said bellows to expand or contract said bellows thereby to regulate the volumetric capacity of said cell, and means to reciprocate said longitudinally reciprocable member.

13. A thermostatically operated valve comprising a hollow body having inlet and outlet openings and a ported valve seat, a reciprocable valve cooperable with said seat, an expansible-collapsible hot chamber in said body and connected operatively to the valve, a thermostatic cell comprising an outer rigid shell secured to the body, an internal bellows housed in the shell and sealed thereto, said cell containing a volatile liquid and being communicatively connected to said hot chamber, a supporting member fixed relative to said shell and projecting into said shell and said bellows, a longitudinally reciprocable member carried by said supporting member and having operative connection with said bellows to expand or contract said bellows thereby to regulate the volumetric capacity of said cell, a spring within said shell and interposed between said bellows and a wall of said shell thereby to retain said bellows and said reciprocable member in engagement, and means to reciprocate said longitudinally reciprocable member.

14. A thermostatically operated valve comprising a hollow body having inlet and outlet openings and a ported valve seat, a reciprocable valve cooperable with said seat, an expansible-collapsible hot chamber in said body and connected operatively to the valve, a thermostatic cell comprising an outer rigid shell having an end wall and secured to the body, an internal bellows housed in the shell and having one end sealed to said shell, said cell containing a volatile liquid and being communicatively connected to said hot chamber, said bellows having a head closing and sealing its other end, a supporting member rigid with said shell and projecting thereinto and into said bellows, an adjustment member within said bellows and operatively connected to said bellows head, means to reciprocate said adjustment member to expand said bellows, and a helical coil spring within said cell and interposed between said end wall and said head thereby to oppose expansion of said bellows by said adjustment member.

LEWIS W. EGGLESTON.
EARNEST J. DILLMAN.